United States Patent
Lv et al.

(10) Patent No.: US 8,155,124 B2
(45) Date of Patent: Apr. 10, 2012

(54) METHOD AND DEVICE OF MPLS NETWORK TRAFFIC SWITCHING

(75) Inventors: Xin Lv, Shenzhen (CN); Zhenbin Li, Shenzhen (CN); Qingsong Xiao, Shenzhen (CN); Bing Wu, Shenzhen (CN); Guangdong Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 12/617,953

(22) Filed: Nov. 13, 2009

(65) Prior Publication Data

US 2010/0054265 A1 Mar. 4, 2010

Related U.S. Application Data

(63) Continuation of application No. PCT/CN2008/070960, filed on May 14, 2008.

(30) Foreign Application Priority Data

May 17, 2007 (CN) .......................... 2007 1 0074540

(51) Int. Cl.
H04L 12/28 (2006.01)
H04L 12/56 (2006.01)
H04L 12/54 (2006.01)

(52) U.S. Cl. ................ 370/395.31; 370/395.5; 370/400; 370/428

(58) Field of Classification Search .................. None
See application file for complete search history.

(56) References Cited

U.S. PATENT DOCUMENTS

| | | | | |
|---|---|---|---|---|
| 6,980,524 B1 * | 12/2005 | Lu et al. | ......................... | 370/254 |
| 7,068,654 B1 * | 6/2006 | Joseph et al. | ................. | 370/392 |
| 2003/0210705 A1 * | 11/2003 | Seddigh et al. | ................ | 370/419 |
| 2004/0088430 A1 * | 5/2004 | Busi et al. | ...................... | 709/238 |
| 2005/0097219 A1 | 5/2005 | Goguen et al. | | |
| 2005/0125490 A1 * | 6/2005 | Ramia | ........................... | 709/202 |

(Continued)

FOREIGN PATENT DOCUMENTS

CN 1464705 A 12/2003

(Continued)

OTHER PUBLICATIONS

He Fengling, et al., Research and Application of Traffic Engineering based on MPLS, College of Computer Science Chongqing University, Oct. 2006, 60 pages.

(Continued)

*Primary Examiner* — Nittaya Juntima
*Assistant Examiner* — Andrew Oh
(74) *Attorney, Agent, or Firm* — Finnegan, Henderson, Farabow, Garrett & Dunner LLP (57) ABSTRACT

A method of MPLS network traffic switching is provided herein. The method includes these steps: receiving a message indicative of creating a new LSP successfully, and generating a new uplink forwarding entry and a new downlink forwarding entry according to the message; storing the new uplink forwarding entry, and configuring the new downlink forwarding entry; configuring the new uplink forwarding entry upon completion of configuring the new downlink forwarding entry; and forwarding the traffic according to the new uplink forwarding entry and the new downlink forwarding entry. By ensuring the sequence of processing the events in the traffic switching process, the method reduces the probability of traffic interruption in the traffic switching process. A network node device for implementing MPLS network traffic switching is also provided herein.

8 Claims, 5 Drawing Sheets

U.S. PATENT DOCUMENTS

| | | | |
|---|---|---|---|
| 2005/0152286 A1* | 7/2005 | Betts et al. | 370/255 |
| 2006/0031490 A1 | 2/2006 | Provine et al. | |
| 2006/0256711 A1* | 11/2006 | Kusama et al. | 370/216 |
| 2007/0019652 A1* | 1/2007 | Shand et al. | 370/395.21 |
| 2007/0133568 A1* | 6/2007 | Qing et al. | 370/397 |
| 2007/0253416 A1* | 11/2007 | Raj | 370/390 |

FOREIGN PATENT DOCUMENTS

| | | |
|---|---|---|
| CN | 1700671 A | 11/2005 |
| CN | 1738288 A | 2/2006 |
| CN | 1780253 A | 5/2006 |
| CN | 1946040 A | 4/2007 |
| CN | 101060483 A | 10/2007 |
| EP | 1753176 A1 | 2/2007 |
| WO | WO 2006/034639 A1 | 4/2006 |
| WO | WO 2008/141567 A1 | 11/2008 |

OTHER PUBLICATIONS

Yan Zhang, A Traffic Engineering Design Based on MPLS, College of Computer Science, Zhejiang University, Mar. 2002, 69 pages.

Awduche, et al., RSVP-TE: Extensions to RSVP for LSP Tunnels, Network Working Group, Request for Comments: 3209, Category: Standards Track, Dec. 2001 (61 pgs.).

Pan, et al., Fast Reroute Extensions to RSVP-TE for LSP Tunnels, Network Working Group, Request for Comments: 4090, Category: Standards Track, May 2005, (38 pgs.).

International Search Report for International Application No. PCT/CN2005/001568, mailed Feb. 6, 2006 Huawei Technologies Co., Ltd. (2 pgs.).

Extended European Search Report, pursuant to Article 62 EPC, the supplementary European search report (Art. 153(7) EPC) and the European search opinion for Application No. 08748566.0-2416, mailed Nov. 27, 2009, Huawei Technologies Co., Ltd. (9 pgs.).

European Patent Office Communication pursuant to Article 94(3) EPC, European search opinion for Application No. 08748566.0-2416, mailed Jul. 8, 2011, Huawei Technologies Co., Ltd. (6 pgs.).

Rosen, et al., Multiprotocol Label Switching Architecture, Network Working Group, Request for Comments: 3031, Category: Standards Track, Jan. 2001, (62 pgs.).

Swallow, et al., RSVP-TE Extensions to RSVP for LSP Tunnels, Network Working Group, Internet Draft, Expiration Date: Aug. 2001, (64 pgs.).

International Search Report for International Application No. PCT/CN2008/070960, mailed Aug. 14, 2008, Huawei Technologies Co., Ltd. (4 pgs.).

Written Opinion of the International Searching Authority (translation) dated (mailed) Aug. 14, 2008, issued in related Application No. PCT/CN2008/070960, filed May 14, 2008, Huawei Technologies Co., Ltd. (7 pgs.).

* cited by examiner

METHOD AND DEVICE OF MPLS NETWORK TRAFFIC SWITCHING

CROSS-REFERENCE TO RELATED APPLICATIONS

This application is a continuation of International Application No. PCT/CN2008/070960, filed May 14, 2008, which claims the benefit of Chinese Patent Application No. 200710074540.4, filed May 17, 2007, both of which are hereby incorporated by reference in their entireties.

FIELD OF THE DISCLOSURE

The present disclosure relates to routing and forwarding technologies in the communication network field, and in particular, to a network traffic switching technology.

BACKGROUND

As a key technology of the Next Generation Network (NGN), the Multi-Protocol Label Switching (MPLS) technology plays a more and more important role in the IP network. If packets are forwarded through label switching in an MPLS network, the network route may be controlled flexibly. Label switching is also applied widely in traffic engineering, Virtual Private Network (VPN), Quality of Service (QoS) control, and so on. The path for forwarding packets in an MPLS network is called a Label Switching Path (LSP).

With the MPLS technology being widely applied in the multi-service bearer of the IP network, traffic switching of the MPLS network becomes an important subject, and is involved in detecting a network fault and creating a traffic protection path. Therefore, the improvement of the traffic switching technology is critical to improving the availability and stability of the MPLS network, and preventing interruption of network traffic.

After an LSP is created in the MPLS network, traffic switching occurs when the user modifies the tunnel configuration of the MPLS Traffic Engineering (MPLS TE) or performs Fast ReRouting (FRR) switching. The method of MPLS network traffic switching in a conventional art includes: sending, by a control plane of a router, an uplink forwarding entry also known as an Incoming Label Mapping (ILM) and a downlink forwarding entry also known as a Next Hop Label Forwarding Entry (NHLFE) to a forwarding unit immediately after a new LSP is created successfully; at the same time, replacing ILM entries and NHLFE entries existent before switching; switching the traffic to the new LSP; and deleting, by the control plane, the LSP existent before the switching, thus finishing the traffic switching.

The NHLFE is used to describe the operations performed by the router for the label, including pushing, popping, and switching. The ILM is a process of mapping the label to the NHLFE performed by the label switching router. On each label switching router of the LSP, a mapping entry of the mapping between the input label and the output label is maintained. For a received label packet, the label switching router needs only to find the corresponding NHLFE according to the ILM entry, and then forward the packet.

In the method of MPLS network traffic switching in the conventional art, the sending of the ILM entry may be asynchronous to the sending of the NHLFE entry, thus causing transient interruption of the traffic. If the sending of the ILM entry is faster than the sending of the NHLFE entry, the following phenomenon may occur in a very short period: The NHLFE entry before switching is not replaced but the ILM entry before switching is already replaced with a new ILM entry. If such a phenomenon occurs, the old NHLFE entry is not available for matching the new ILM entry before the NHLFE entry is replaced, and the traffic may be interrupted transiently. Besides, the upstream node forwarding entry is asynchronous to the downstream node forwarding entry, which also causes transient interruption of the traffic. If the traffic of the upstream node is switched to the new LSP before the downstream node forwarding entry is sent completely, the traffic may also be interrupted transiently. Traffic interruption deteriorates the availability and stability of the network seriously.

SUMMARY

Various embodiments of the present disclosure provide a method of MPLS network traffic switching and a network node device, so as to reduce traffic interruption in the traffic switching process and improve the stability and availability of the MPLS network.

The method includes: receiving a message indicative of creating an LSP successfully; generating an uplink forwarding entry and a downlink forwarding entry according to the message indicative of creating an LSP successfully; sending the downlink forwarding entry to a forwarding unit; sending the uplink forwarding entry to the forwarding unit after completion of forwarding the downlink forwarding entry; and performing, by the forwarding unit, traffic forwarding according to the uplink forwarding entry and the downlink forwarding entry.

A network node device is provided in an embodiment of the present disclosure. The network node device includes:
a data receiving unit, adapted to receive data from another node in the network;
a forwarding unit, adapted to forward the data received by the data receiving unit according to the forwarding entry;
a signaling receiving unit, adapted to receive the message indicative of creating an LSP successfully;
a forwarding entry generating unit, adapted to generate a forwarding entry according to the message indicative of creating an LSP successfully, where the types of the forwarding entry include an uplink forwarding entry and a downlink forwarding entry; and
a forwarding entry sending unit, adapted to: send the downlink forwarding entry generated by the forwarding entry generating unit to the forwarding unit at the first moment, and send the uplink forwarding entry generated by the forwarding entry generating unit to the forwarding unit at the second moment.

The method of MPLS network traffic switching and the network node device provided herein ensure the sequence of processing the events in the traffic switching process, thus ensuring traffic stability in the traffic switching process and preventing traffic interruption.

DETAILED DESCRIPTION

Figure 1:
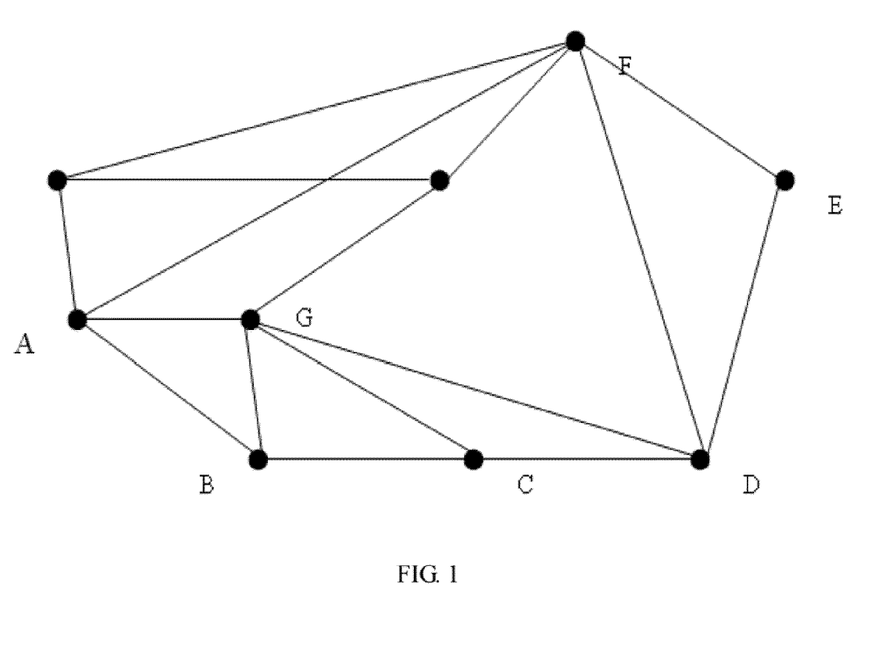
FIG. 1 schematically shows a protocol LSP in an MPLS network.

As shown in FIG. 1, the path A-B-C-D-E is an LSP of an MPLS network. The path A-G-C is adapted to protect node B and relevant links, the path B-G-D is adapted to protect node C and relevant links, the path C-F-E is adapted to protect node D and relevant links, and the path D-F-E is adapted to protect the link D-E. If the link B-C fails, the traffic on node B may be switched to the B-G-D path immediately, thus avoiding packet loss. In the FRR which serves as a temporary protection mode, the main tunnel triggers creation of a new LSP immediately after a link fault occurs. After the new LSP is created successfully, the traffic is switched to the new LSP.

Figure 2:
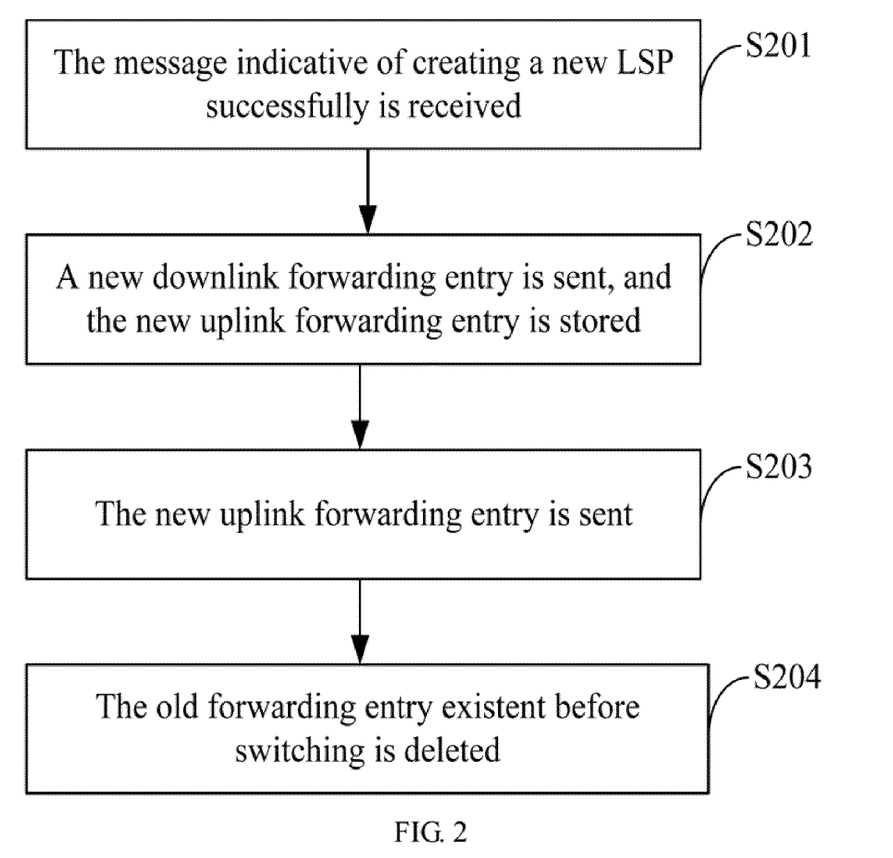
FIG. 2 is a flowchart of MPLS network traffic switching in an embodiment of the present disclosure.

After the LSP on the MPLS network is created, the user modifies the attribute of the MPLS traffic engineering tunnel. Alternatively, when traffic switching occurs in the FRR, the network triggers creation of a new LSP and switches the traffic to the new LSP. As shown in FIG. 2, a method of MPLS network traffic switching is provided in an embodiment of the present disclosure. When an ingress of an LSP receives a RSVP reservation request (RESV) message indicative of creating a new LSP successfully (step S201), a new uplink forwarding entry and a new downlink forwarding entry are generated. The message indicative of creating the new LSP successfully records the information required for traffic engineering, for example, sequence number of the session, label object, and resource and stream object paths. Afterward, the control plane of the ingress device stores the new uplink forwarding entry and sends the new downlink forwarding entry to the forwarding unit (step S202). After the new downlink forwarding entry is forwarded, the control plane of the network node device of the ingress sends the stored new uplink forwarding entry (step S203). The forwarding unit forwards the data according to the new forwarding entry, thus implementing traffic switching. After the traffic is switched successfully, the old forwarding entry before switching is deleted from the forwarding unit (step S204).

Taking the MPLS network illustrated in FIG. 1 as an example, the LSP A-B-C-D-E of the MPLS network is switched to the LSP A-G-C-D-E. When receiving a message indicative of creating the new LSP successfully "A-G-C-D-E" (Resource Reservation), the ingress A generates a new uplink forwarding entry and a new downlink forwarding entry. The control plane of the ingress A stores the uplink forwarding entry (ILM entry), for example, stores the ILM entry in its control plane or a storing unit. Its control plane sends the NHLFE entry of the downlink forwarding entry. After the forwarding entry is updated to the new ILM entry, the traffic switching succeeds, and the control plane deletes the tunnel A-B-C-D-E existent before switching. At this time, the main tunnel of traffic is the tunnel A-G-C-D-E.

Figure 3:
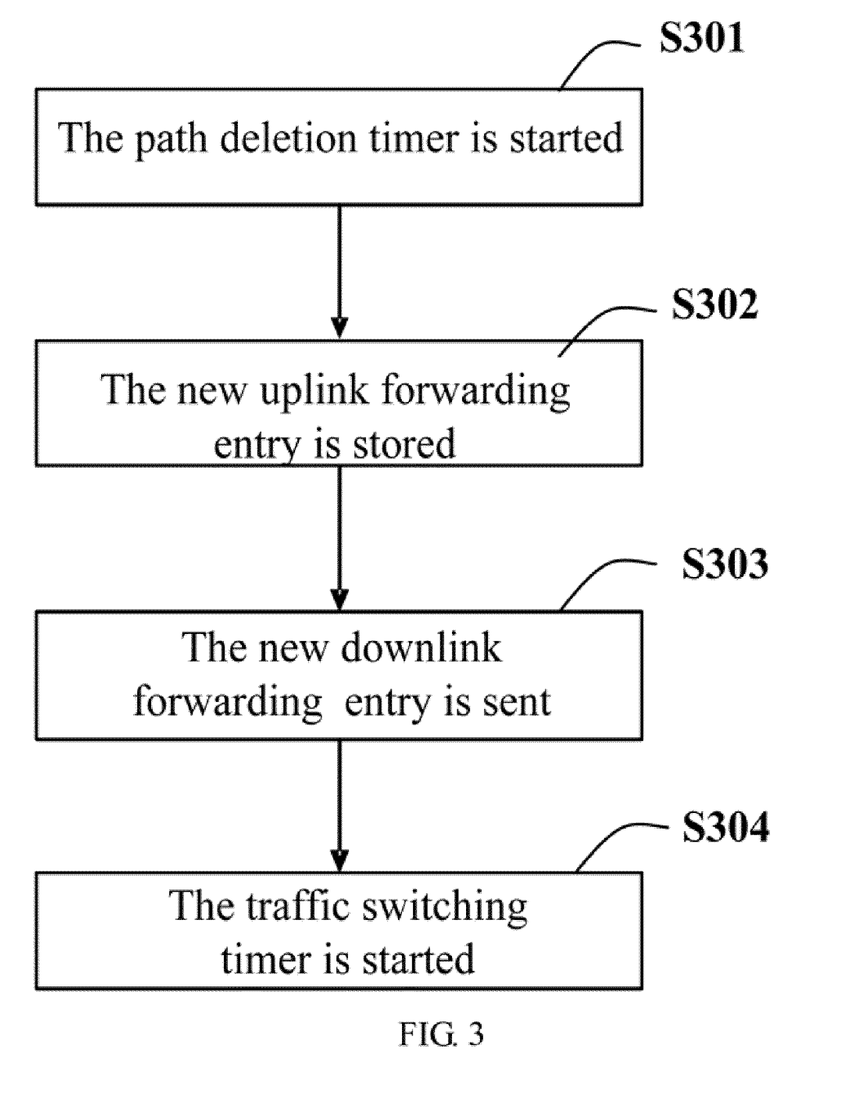
FIG. 3 is a more detailed flowchart of step S202 illustrated in FIG. 2.
Figure 4:
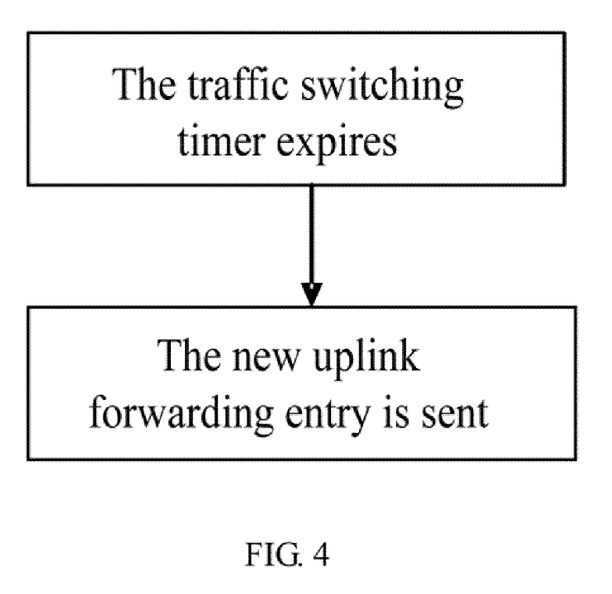
FIG. 4 is a more detailed flowchart of step S203 illustrated in FIG. 2.
Figure 5:
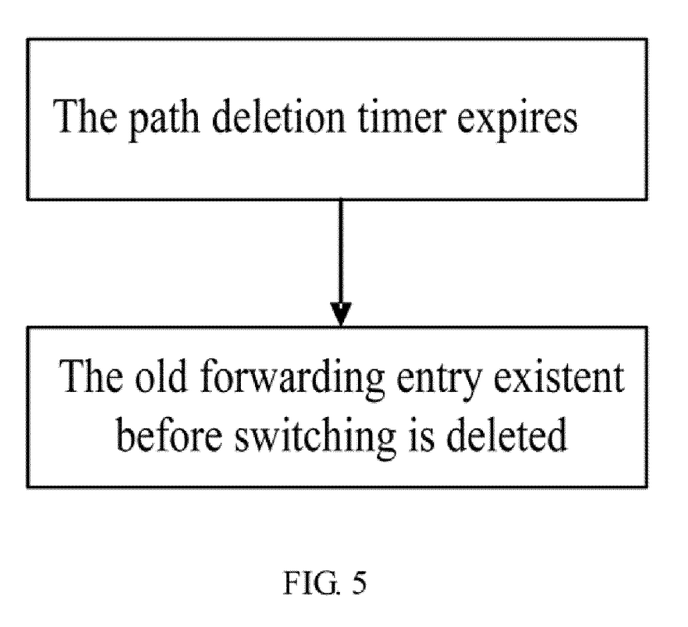
FIG. 5 is a more detailed flowchart of step S204 illustrated in FIG. 2.

In order to ensure the sequence of processing the events, a timer is introduced into the method of MPLS network traffic switching in a first embodiment of the present disclosure to ensure the sequence of processing the events in the traffic switching process. FIG. 3 is a more detailed flowchart of step S202. When the ingress of the LSP receives the message indicative of creating the new LSP successfully, a path deletion timer is started (step S301). Afterward, the control plane stores the ILM of the new uplink forwarding entry (step S302) and sends the NHLFE of the new downlink forwarding entry (step S303). Step S302 and step S303 may occur at the same time. A traffic switching timer is started after the control plane sends the NHLFE of the new downlink forwarding entry (step S304). As shown in FIG. 4 which is a more detailed flowchart of step S203, the control plane sends the ILM of the uplink forwarding entry upon timeout of the traffic switching timer. As shown in FIG. 5 which is a more detailed flowchart of step S204, the old forwarding entry existent before switching is deleted upon timeout of the path deletion timer.

The event of creating the new LSP successfully triggers start of the path deletion timer, and the event that the control plane sends a new downlink forwarding entry triggers start of the traffic switching timer. The user may change and configure the delay duration of the timers. The arrival timeout duration of the path deletion timer is greater than that of the traffic switching timer.

Still taking the MPLS network shown in FIG. 1 as an example, the path deletion timer is started as soon as the ingress A receives a message indicative of creating a new LSP successfully. Afterward, the control plane of node A stores the ILM of the new uplink forwarding entry. Meanwhile, the control plane sends the NHLFE of the new downlink forwarding entry without replacing the NHLFE of the downlink forwarding entry existent before switching. At this time, the uplink information of the ingress A is the ILM of the uplink forwarding entry existent before switching. In the downlink information, the NHLFE of the downlink forwarding entry existent before switching coexists with the NHLFE of the new downlink forwarding entry. That is, the NHLFE of the downlink forwarding entry of the path A-B-C-D-E coexists with that of the path A-G-C-D-E at node A. A traffic switching timer is started after the control plane of the ingress A sends the NHLFE of the downlink forwarding entry. Upon completion of forwarding the new downlink forwarding entry, the control plane sends the uplink forwarding entry ILM of node A. The new uplink forwarding entry ILM replaces the uplink forwarding entry ILM existent before switching. At this time, the ILM of the new uplink forwarding entry applies in the uplink information of the ingress A, but the NHLFE of the downlink forwarding entry of the path A-B-C-D-E still coexists with that of the path A-G-C-D-E at node A. Upon timeout of the path deletion timer, the control plane deletes the LSP existent before switching, namely, deletes the path A-B-C-D-E and relevant entries. At this time, the NHLFE of the downlink forwarding entry of node A existent before switching is deleted by the control plane of the ingress A, only the ILM of the new uplink forwarding entry and the NHLFE of the downlink forwarding entry are stored, and the traffic is switched to the new LSP A-G-C-D-E completely. The LSP is an ordinary LSP, or specifically, a constraint-based LSP. When the LSP is a constraint-based LSP, the process and the method of traffic switching described above still apply.

Through the method of MPLS network traffic switching, upon receiving the message indicative of creating the new LSP successfully, the ingress A of the LSP sends the NHLFE of the new downlink forwarding entry. However, the ILM of the new uplink forwarding entry is not sent, but is stored. The traffic switching timer is started. The ILM of the new uplink forwarding entry is sent only when the timer expires. The LSP A-B-C-D-E existent before switching is not deleted immediately. Once the path deletion timer expires, the timeout triggers deletion of the LSP A-B-C-D-E existent before switching. The value of the traffic switching timer and the path deletion tinier may be a default value or a user-defined value. The two timers ensure that: When the head node A switches traffic, all downstream nodes have sent the new forwarding entry; and the NHLFE entry of the old downlink forwarding entry exists until the ILM entry of the new uplink forwarding entry is sent. The method of traffic switching in an embodiment of the present disclosure uses a timer to ensure the sequence of processing the events in the traffic switching process, and provides buffering through short coexistence of the new forwarding entry and the old forwarding entry, thus reducing the probability of traffic interruption in the traffic switching process.

In order to ensure the sequence of processing the events, in the method of MPLS network traffic switching in a second embodiment of the present disclosure, the new uplink forwarding entry is sent only after it is determined that the new downlink forwarding entry is forwarded completely. Unlike the first embodiment, the second embodiment does not need to set a path deletion timer. After receiving the message indicative of creating the new LSP successfully, the ingress of the LSP generates a new uplink forwarding entry and a new downlink forwarding entry, and sends the new downlink forwarding entry first. After receiving the new downlink forwarding entry, the forwarding unit of the ingress generates a feedback message, and returns the feedback message to the control plane. After receiving the feedback message, the control plane determines that the new downlink forwarding entry is sent completely, and sends the new uplink forwarding entry. Through the method of MPLS network traffic switching, upon receiving the message indicative of creating the new LSP successfully, the ingress A of the LSP sends the NHLFE of the new downlink forwarding entry. However, the ILM of the new uplink forwarding entry is not sent, but is stored. The ILM of the new uplink forwarding entry is sent only after the new downlink forwarding entry is forwarded completely. The foregoing method accomplishes the effect of the first embodiment.

Figure 6:
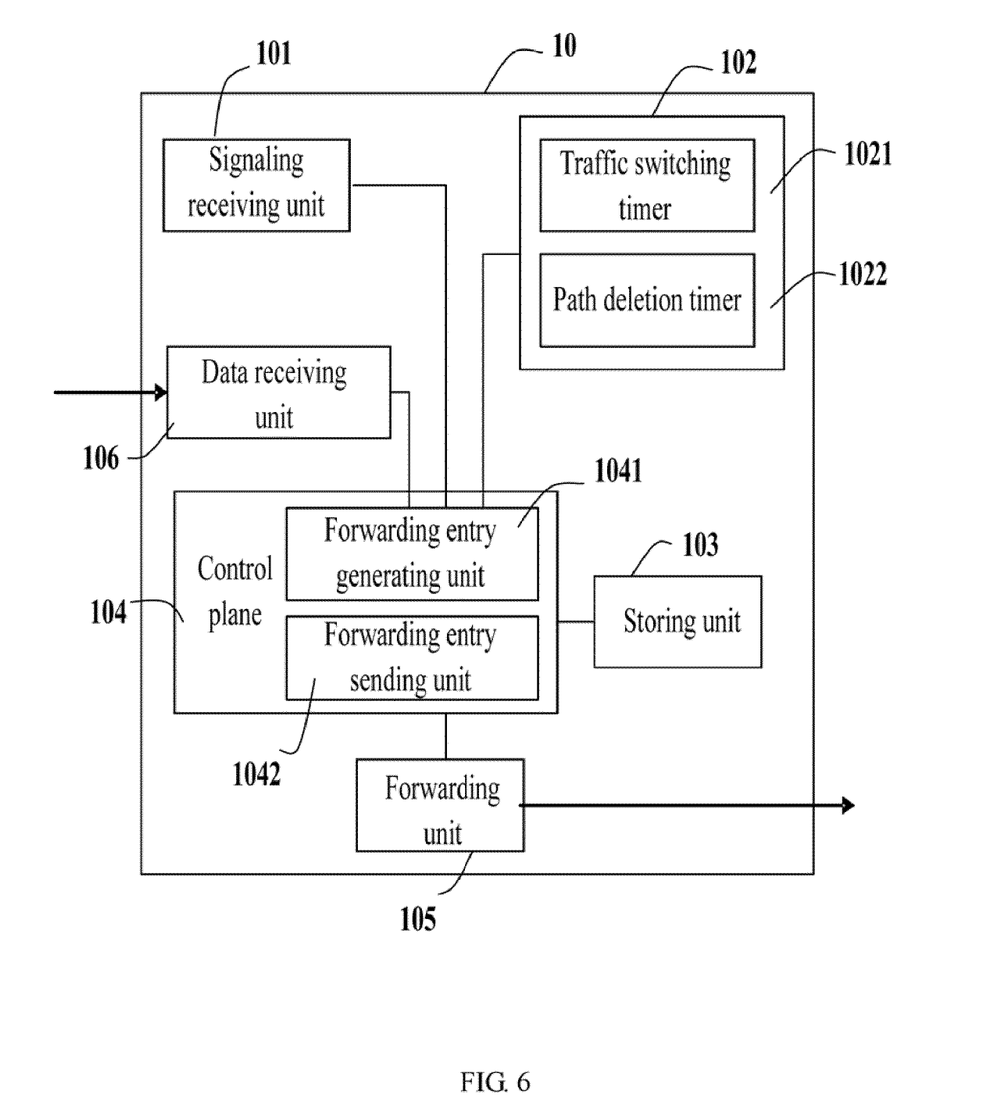
FIG. 6 shows a structure of a network node device in an embodiment of the present disclosure.

A network node device is provided in an embodiment of the present disclosure. FIG. 6 shows a structure of the network node device. The network node device 10 provided in this embodiment includes: a signaling receiving unit 101, a timer unit 102, a control plane 104, a forwarding unit 105, and a data receiving unit 106.

The control plane 104 is coupled with the data receiving unit 106, the signaling receiving unit 101, the timer unit 102, and the forwarding unit 105, and controls the data receiving unit 106, the signaling receiving unit 101, the timer unit 102, and the forwarding unit 105, thus implementing communication between the units. The forwarding unit 105 further includes a feedback message generating unit. After receiving the forwarding entry sent by the control plane, the forwarding unit 105 generates a feedback message, which informs the control plane 104 that the forwarding unit 105 has received the forwarding entry sent by the control plane 104. The control plane 104 includes a forwarding entry generating unit 1041. When receiving the message indicative of creating the new LSP successfully, the forwarding entry generating unit 1041 generates a new uplink forwarding entry and a new downlink forwarding entry. The control plane 104 includes a forwarding entry sending unit 1042, adapted to: receive the new downlink forwarding entry and send the downlink forwarding entry to the forwarding unit 105 at a first moment; receive the new uplink forwarding entry and send the uplink forwarding entry to the forwarding unit 105 at a second moment. Besides, the control plane 104 is further responsible for label distribution, creation and sending of the forwarding entry, and deletion of the LSP. The network node device may further include a storing unit 103. The forwarding entry created by the control plane 104 is stored in the storing unit 103 temporarily if it is not sent immediately after being created. Alternatively, the storing unit 103 may be set in the control plane 104.

The signaling receiving unit 101 is adapted to receive the signaling and messages in the network, for example, the message indicative of creating an LSP successfully. The data receiving unit 106 is adapted to receive the packets transmitted in the network. The timer unit 102 is adapted to set and start a timeout timer. The timer unit 102 includes a traffic switching timer 1021 and a path deletion timer 1022. When the signaling receiving unit 101 receives a message indicative of creating the LSP successfully, the path deletion timer 1022 is triggered. When the control plane 104 sends a forwarding entry, the traffic switching timer 1021 is triggered. The timers mentioned above are overtime timers. The overtime of the traffic switching timer 1021 triggers the control plane 104 to send the forwarding entry stored in the control plane 104 or the storing unit 103 temporarily. The forwarding unit 105 forwards the packets received by the data receiving unit 1012 according to the forwarding entry sent by the control plane 104.

At the time of network traffic switching, if the network node device is an ingress of an LSP and its signaling receiving unit 101 receives a message indicative of creating an LSP successfully, the control plane 104 creates a new forwarding entry, and sends the forwarding entry or stores the forwarding entry temporarily as required. The signaling receiving unit 101 triggers the path deletion timer 1022 in the timer unit 102 upon receiving the message indicative of creating an LSP successfully. When the control plane 104 sends a forwarding entry (at a first moment), the traffic switching timer 1021 is triggered. Upon timeout of the traffic switching timer 1021 (at a second moment), the control plane sends the forwarding entry temporarily stored in the control plane 104 or the storing unit 103. Upon timeout of the path deletion timer 1022, the control plane deletes the forwarding entry existent before switching. The forwarding unit 105 forwards the packets received by the data receiving unit 106 according to the forwarding entry. By now, the network node device has finished traffic switching, which reduces the probability of traffic interruption in the traffic switching process.

In another embodiment of the ingress of the LSP, the traffic switching timer 1021 is avoided, but the forwarding unit 105 includes a feedback message generating unit. As soon as the forwarding entry generating unit 1041 generates a forwarding entry, the forwarding entry sending unit 1042 sends a new downlink forwarding entry to the forwarding unit 105 (at a first moment). After the forwarding unit 105 receives the new uplink forwarding entry, the feedback message generating unit generates a feedback message and sends it to the signaling receiving unit 101. After the signaling receiving unit 101 receives the feedback message (at a second moment), the control plane controls the sending unit 1042 to send a new uplink forwarding entry.

In the network traffic switching, the node device which is not an ingress of the LSP does not need to receive the message indicative of creating an LSP successfully. The control plane 104 creates a new forwarding entry according to the routing information, and sends the forwarding entry or stores it temporarily as required. When the control plane 104 sends a forwarding entry, the traffic switching timer 1021 is triggered. Upon timeout of the traffic switching timer 1021, the control plane sends the forwarding entry temporarily stored in the control plane 104 or the storing unit 103. Upon timeout of the path deletion timer 1022, the control plane deletes the forwarding entry existent before switching. The forwarding unit 105 forwards the packets received by the data receiving unit 1012 according to the forwarding entry. By now, the network node device has finished traffic switching, which reduces the probability of traffic interruption in the traffic switching process.

What is claimed is:

1. A method of Multi-Protocol Label Switching, MPLS, network traffic switching, comprising: receiving a message indicative of creating a Label Switching Path, LSP, successfully; generating an uplink forwarding entry and a downlink forwarding entry according to the message indicative of creating the LSP successfully; sending the downlink forwarding entry to a forwarding unit; sending the uplink forwarding entry to the forwarding unit after the downlink forwarding entry is forwarded completely; and forwarding, by the forwarding unit, traffic according to the uplink forwarding entry and the downlink forwarding entry, wherein the sending of the uplink forwarding entry to the forwarding unit after the downlink forwarding entry is forwarded completely comprises: starting a traffic switching timer when sending the downlink forwarding entry, and sending the uplink forwarding entry upon timeout of the traffic switching timer.

2. The method of MPLS network traffic switching according to claim 1, wherein the sending of the downlink forwarding entry to the forwarding unit comprises:
    sending the downlink forwarding entry to the forwarding unit, and retaining an old downlink forwarding entry existent before switching in the forwarding unit.

3. The method of MPLS network traffic switching according to claim 2, further comprising:
    starting a path deletion timer upon receiving a message indicative of creating a new LSP successfully; and
    deleting the old downlink forwarding entry existent before switching upon timeout of the path deletion timer.

4. The method of MPLS network traffic switching according to claim 2, wherein the retaining of the old downlink forwarding entry existent before switching in the forwarding unit comprises:
    storing the uplink forwarding entry in a forwarding entry generating unit before sending the uplink forwarding entry.

5. A network node device, comprising: a data receiving unit, adapted to receive data from another node in a network; a forwarding unit, adapted to forward the data received by the data receiving unit according to a forwarding entry; a signaling receiving unit, adapted to receive a message indicative of creating a Label Switching Path, LSP, successfully; a forwarding entry generating unit, adapted to generate the forwarding entry according to the message indicative of creating the LSP successfully, wherein types of the forwarding entry comprise an uplink forwarding entry and a downlink forwarding entry; a forwarding entry sending unit, adapted to: send the downlink forwarding entry generated by the forwarding entry generating unit to the forwarding unit at a first moment, and send the uplink forwarding entry generated by the forwarding entry generating unit to the forwarding unit at a second moment; and a traffic switching timer, adapted to: perform timing, and be started when the forwarding entry sending unit sends the downlink forwarding entry generated by the forwarding entry generating unit to the forwarding unit, when the forwarding entry sending unit sends the uplink forwarding entry generated by the forwarding entry generating unit to the forwarding unit upon timeout of the traffic switching timer.

6. The network node device of claim 5, further comprising:
    a path deletion timer, adapted to be started when the signaling receiving unit receives a message indicative of creating a Label Switching Path, LSP, successfully; and
    a deleting unit, adapted to delete an old downlink forwarding entry in the forwarding unit upon timeout of the path deletion timer.

7. The network node device of claim 3, wherein the forwarding entry generating unit further comprises:
    a storing unit, adapted to store new uplink forwarding entries.

8. The network node device of claim 5, further comprising:
    a storing unit, adapted to store a new uplink forwarding entry generated by the forwarding entry generating unit.

* * * * *